(12) United States Patent
Foote (10) Patent No.: US 8,127,313 B2
(45) Date of Patent: Feb. 28, 2012

(54) METHOD AND SYSTEM FOR PROVIDING SERVICES

(75) Inventor: William F. Foote, Los Angeles, CA (US)

(73) Assignee: Oracle America, Inc., Redwood City, CA (US)

( * ) Notice: Subject to any disclaimer, the term of this patent is extended or adjusted under 35 U.S.C. 154(b) by 1003 days.

(21) Appl. No.: 12/060,085

(22) Filed: Mar. 31, 2008

(65) Prior Publication Data

US 2009/0249415 A1 Oct. 1, 2009

(51) Int. Cl.
*G06F 9/46* (2006.01)

(52) U.S. Cl. ........ 719/328; 725/109; 725/110; 725/114; 725/117

(58) Field of Classification Search .................. None
See application file for complete search history.

(56) References Cited

U.S. PATENT DOCUMENTS

| | | | |
|---|---|---|---|
| 2005/0226641 A1* | 10/2005 | Ando et al. | 399/8 |
| 2006/0143622 A1* | 6/2006 | Prabandham et al. | 719/328 |
| 2007/0094676 A1* | 4/2007 | Fresko et al. | 719/330 |

* cited by examiner

*Primary Examiner* — H. S. Sough
*Assistant Examiner* — Umut Onat
(74) *Attorney, Agent, or Firm* — Osha • Liang LLP (57) ABSTRACT

A method for providing a service on a device. The method includes instantiating a service provider that provides the service, where the service provider implements a service provider interface (SPI) corresponding to the service and where the SPI is defined by a service provision framework for providing services to Xlets. The method further includes using the service by a first Xlet, where the first Xlet uses the service provider interface (SPI).

20 Claims, 6 Drawing Sheets

METHOD AND SYSTEM FOR PROVIDING SERVICES

BACKGROUND

The Java™ Xlet application model was first introduced by Sun Microsystems in the Java TV™ application programming interface (API) for developing digital television applications for Java-enabled digital TV receivers. Java™ and Java TV™ are registered trademarks of Sun Microsystems, Santa Clara, Calif. In a digital TV receiver, several applications may be running simultaneously, such as an application for playing a game in conjunction with a game show and an application that shows program listings. Due to limited resources in the digital TV receiver, if a user is playing the game and decides to look at program listings, the game application needs to be temporarily paused to allow the program listings application to execute. Further, some of the resources used by the game application may need to be released to allow the program listing application to execute. The traditional Java™ application model is not ideally suited to this environment because in the traditional Java™ application model, lifecycles of applications are controlled by the applications.

In the Xlet application model, the life cycles of Xlets are controlled by an application manager that runs the Xlets. The Xlet interface provides four life cycle methods: initXlet( ), startXlet( ), pauseXlet( ), and destroyXlet( ). Thus, Xlets have four possible states: 1) a loaded state in which the Xlet instance is constructed but has not yet been initialized; 2) a paused state in which the Xlet has been initialized but is currently inactive; 3) an active state in which the Xlet is active; and 4) a destroyed state in which the Xlet has been terminated and is ready for garbage collection. When an Xlet is created by an application manager, the Xlet starts in the loaded state. The Xlet moves to the paused state after the application manager initializes the Xlet using the initXlet( ) method. At some point, the application manager may activate the Xlet by invoking the startXlet( ) method, at which time the Xlet activates the Xlet's user interface, obtains any system resources needed, and shifts to the active state. At any time, the application manager may deactivate the Xlet by invoking the pauseXlet( ) method, at which time the Xlet frees as many system resources as possible and moves to the paused state. The application manager may also destroy the Xlet at any time by invoking the destroyXlet( ) method, which moves the Xlet to the destroyed state.

Thus, if the game application and the program listing application are implemented as Xlets, an application manager in the digital TV receiver may use the life cycle methods of these Xlets to manage the interaction. When the user decides to look at program listings while playing the game, the application manager can pause the game Xlet and activate the program listing Xlet. If the user goes back to the game, the application manager can pause the program listing Xlet and activate the game Xlet.

Since the initial introduction of the Xlet application model, the model has been included in Java 2 Platform Micro Edition (J2ME™), a set of Java™ APIs for developing Java™ applications for resource-constrained devices such as cell phones, personal digital assistants, set top boxes and other consumer appliances. J2ME™ is a registered trademark of Sun Microsystems, Santa Clara, Calif. The Xlet application model is also included in other programming standards for limited-resource environments such as the Digital Video Broadcasting Project Multimedia Home Platform (DVB-MHP) programming standard.

In the digital broadcasting environment, many kinds of services may be introduced. In addition to the game playing example presented above, there may be services for tuning to internet broadcasts as well as to television broadcasts, chat services for communicating with other viewers, order placement services for placing orders for advertised products, a navigation service for navigating the available digital television services (e.g., program information), a teletext service for browsing pages of text and graphics, etc. Ideally, providers of the services would be able to implement service provider applications for use on set-top boxes from multiple manufacturers.

Service provider frameworks have been implemented for use in other Java™ environments based on the traditional Java™ application model to permit multiple providers of a service to provide the services in a standardized way. A service provider framework typically includes a set of interfaces and classes (usually abstract) (i.e., a service provider interface (SPI)) for a type of service (e.g., a cryptography service, a naming service, a directory service, etc.). A provider of the type of service represented by the service provider framework (i.e., the service provider) is required to implement the defined interfaces and classes as part of the implementation of the service in order to provide the service to Java™ applications. Java™ applications may then directly share instances of the implemented service provider and may use the service through the defined interfaces.

Service provider frameworks are currently not available for use in an Xlet application model. In the Xlet application model, an Xlet is not permitted to directly share mutable object instances with other Xlets, whereas sharing of instances of a service provider is required in known service provider frameworks.

SUMMARY

In general, in one aspect, the invention relates to a method for providing a service on a device. The method includes instantiating a service provider that provides the service, wherein the service provider implements a service provider interface (SPI) corresponding to the service, wherein the SPI is defined by a service provision framework for providing services to Xlets, and using the service by a first Xlet, wherein the first Xlet uses the service provider interface (SPI).

In general, in one aspect, the invention relates to a system for providing services to Xlets. The system includes a service provision framework comprising a first service provider interface (SPI) for an Xlet-bound service provider and a second SPI for a system bound service provider, a first Xlet configured to access a first service using the first SPI and to access a second service using the second SPI, a second Xlet configured to access the second service using the second SPI, a first service provider instance implementing the first SPI, and a second service provider instance implementing the second SPI, wherein the first service provider instance provides the first service only to the first Xlet, and wherein the second service provider instance provides the second service to the first Xlet and the second Xlet.

In general, in one aspect, the invention relates to a computer readable medium comprising executable instructions to provide a service by instantiating a service provider that provides the service, wherein the service provider implements a service provider interface (SPI) corresponding to the service, wherein the SPI is defined by a service provision framework for providing services to Xlets, and using the service by a first Xlet, wherein the first Xlet uses the service provider interface (SPI).

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a service provision framework for installing and managing service provider interfaces (SPIs) for use by Xlets. Specifically, embodiments of the invention provide an application programming interface (API) for defining, installing, and managing two classes of SPIs: an SPI for Xlet-bound service providers and an SPI for system bound service providers. An Xlet-bound service provider provides a service to only one Xlet and a system bound service provider provides a service that may be used by multiple Xlets.

Figure 1:
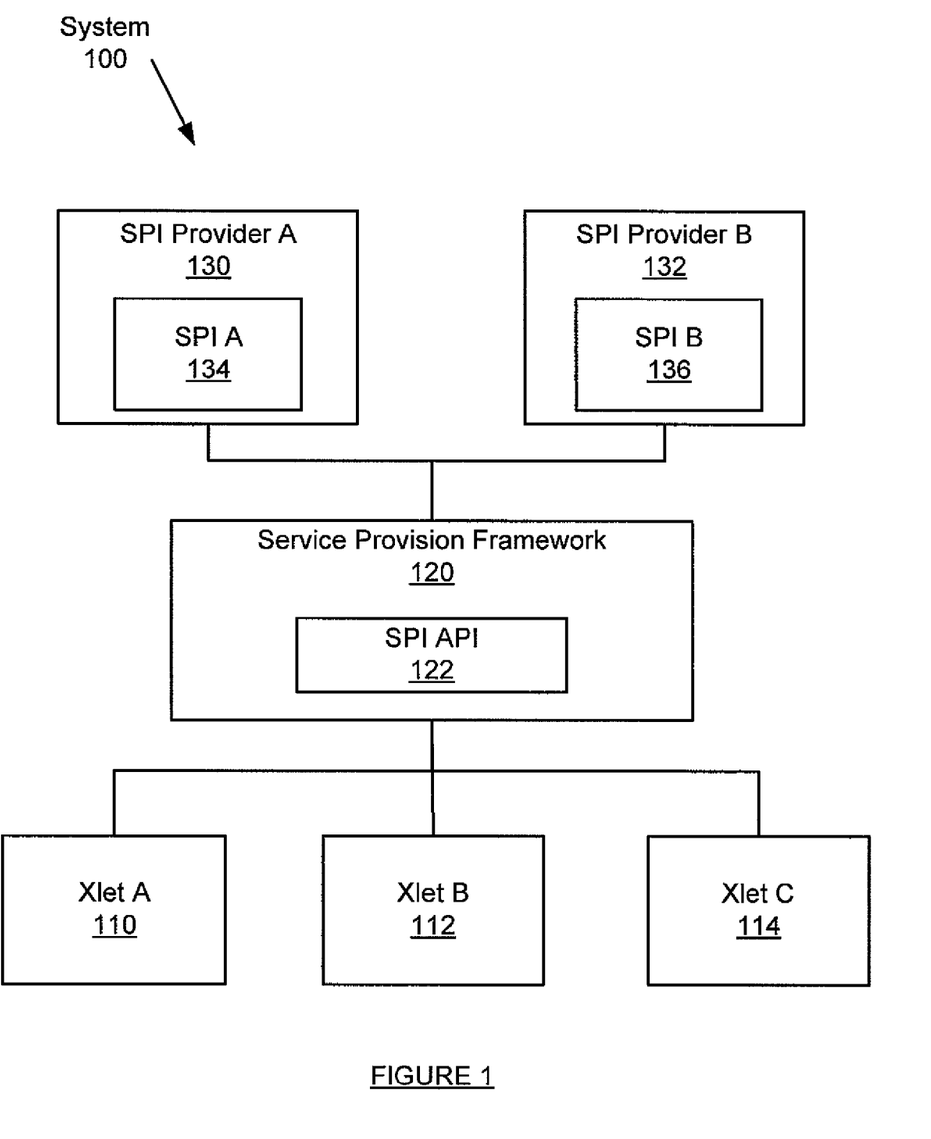
FIG. 1 shows a system diagram in accordance with one or more embodiments of the invention.

FIG. 1 shows a system (100) (also referred to as a "device") in accordance with one or more embodiments of the invention. In one embodiment of the invention, the system (100) includes firmware loaded on to the system. Further, the firmware includes one or more APIs which may be used to interact with the device. In addition, as shown in FIG. 1, the system (100) includes one or more Xlets (e.g., Xlet A (110), Xlet B (112), Xlet C (114)), a service provision framework (120), and one or more service providers (e.g., SPI provider A (130), SPI provider B (132)). While two service providers and three Xlets are shown in the system of FIG. 1, one of ordinary skill will appreciate that fewer or more Xlets and service providers may be included in other embodiments of the system.

In one or more embodiments of the inventions, the Xlets (e.g., Xlet A (110), Xlet B (112), Xlet C (114)) are applications that may use the services of one or more service providers (e.g., SPI provider A (130), SPI provider B (132)). A service provider (e.g., SPI provider A (130), SPI provider B (132)) is a software application that provides a service. For example, in a digital video broadcast (DVB) system, services providers may be included for, among others, a game service, a tuner service, a chat service, an order placement service, a navigation service, and a service information (SI) service that provides Java TV™ SI data. SI data is digital data in DVB bitstreams that describes the delivery system, content, and scheduling/timing of broadcast data streams. SI data may be uses in the selection of services and/or events and to automatically configure an integrated receiver decoder (IRD) for a selected service. Further, SI data may be used as a basis for an electronic programming guide.

A service provider (e.g., SPI provider A (130), SPI provider B (132)) includes an implementation of an SPI (e.g., SPI A (134), SPI B (136)) that may be used by an Xlet (e.g., Xlet A (110), Xlet B (112), Xlet C (114)) to access the service provided by the service provider. More specifically, a service provider (e.g., SPI provider A (130), SPI provider B (132)) implements an SPI defined by the SPI API (122) of the service provision framework (120). As is explained in more detail below, in some embodiments of the invention, depending on the implementation of the service provider, a service provider (e.g., SPI provider A (130), SPI provider B (132)) may be instantiated by one Xlet and provide services to other Xlets, or the service provider may be instantiated by one Xlet and provide services only to that Xlet.

In one or more embodiments of the invention, a service provision framework (120) includes functionality for the installation and management of SPI implementations. This functionality includes an SPI API (122). The service provision framework (120) also includes a registry (not shown) of all service providers (e.g., SPI provider A (130), SPI provider B (132)) instantiated in the system (100). The SPI API (122) includes a set of interfaces and classes, i.e., an SPI, for each type of service represented by the service provision framework (120). At least some, if not all of the interfaces and classes may be abstract. Further, a service provider (e.g., SPI provider A (130), SPI provider B (132)) is required to implement the defined interfaces and classes of the SPI for the type of service to be provided in order to provide the services to the Xlets (e.g., Xlet A (110), Xlet B (112), Xlet C (114)) in the system (100). For example, continuing the DVB system example, the SPI API (122) may define, among others, an SPI for a service information (SI) service and an SPI for a tuner service. A service provider that provides a tuner service is required to implement the tuner SPI and a service provider that provides an SI service is required to implement the SI SPI.

The SPI API (122) defines two types of SPIs that may be used in the implementation of service providers (e.g., SPI provider A (130), SPI provider B (132)) that provide services to Xlets (e.g., Xlet A (110), Xlet B (112), Xlet C (114)). The two SPI types provide for an Xlet-bound service provider and a system bound service provider. An Xlet-bound service provider provides a service to a single Xlet. A system bound service provider may provide the service to multiple Xlets. The functionality of an Xlet-bound service provider and a system bound service provider is explained in more detail below.

More specifically, the SPI API (122) defines a core set of abstract classes that are extended to define SPIs for Xlet-bound service providers and system bound service providers. In one or more embodiments of the invention, the SPI API (122) defines a class hierarchy that includes an abstract superclass for all service providers and a provider registry class. The service provider superclass extends java.lang.Object and includes two abstract methods: a method that is called by the system (100) when a service provider is registered and a method that is called by the system (100) when a service provider is unregistered. These two methods are implemented by each SPI implementation (e.g., SPI A (134), SPI B (136)).

The provider registry class includes methods for registering and unregistering of a service provider. In one or more embodiments of the invention, the method for registering a service provider throws an error if the provider to be registered is not an instance of a subclass of the service provider superclass.

The SPI API (122) also includes two superclasses that extend the service provider superclass, a system bound provider superclass and an Xlet-bound provider superclass. The system bound provider superclass is extended to define SPIs for service providers that are registered from one Xlet, but provide system-wide services, i.e., services that are available to any Xlet (e.g., Xlet A (110), Xlet B (112), Xlet C (114)) in the system (100). Service providers that implement an SPI that extends the system bound service provider superclass operate such that there is no sharing of mutable object instances between the Xlet that installs the service provider, and any Xlet that uses the services of the service provider.

The Xlet-bound provider superclass is extended to define SPIs for service providers that provide services for exactly one Xlet: the Xlet that registers the service provider. Further, the classes of the service provider are in the class loader hierarchy of the Xlet that registers the service provider. In other words, each Xlet that needs the services provided by such a service provider must carry its own copy of the service provider.

Continuing the DVB system example, the SPI API (122) may define an SPI for an Xlet-bound SI service and an SPI for a system bound Tuner service. More specifically, the SPI API (122) may include the three Java™ packages shown in Table 1.

TABLE 1

| Package Name | Description |
|---|---|
| org.dvb.spi | Defines a central registry for all DVB SPI providers |
| org.dvb.spi.si | Defines an SPI for providing full Java TV ™ SI information. This is an SPI for an Xlet-bound service provider. |
| org.dvb.spi.tuner | Defines an SPI for a tuner. This is an SPI for a system bound service provider. |

The package org.dvb.spi may include the classes shown in Table 2.

TABLE 2

| Class Name | Description |
|---|---|
| Provider | Abstract superclass for all DVB service providers |
| ProviderRegistry | Registry of providers |
| SystemBoundProvider | Abstract superclass for system bound service providers |
| XletBoundProvider | Abstract superclass for Xlet-bound service providers |

The class Provider extends java.lang.Object and has two direct subclasses, SystemBoundProvider and XletBoundProvider. The class Provider also includes two abstract methods: providerRegistered ( ) which is called by the system when a service provider implementing the class is registered; and providerUnregistered ( ) which called by the system when a service provider implementing the class is unregistered.

The class ProviderRegistry extends java.lang.Object and includes three public methods: register (Provider p) which may be called when a service provider is instantiated to register the service provider; unregister (Provider p) which may be called when a service provider is terminated; and getInstance ( ) which may be called to get an instance of a provider registry. The register method throws a java.lang.IllegalArgumentException if the Provider is not an instance of a system-defined subclass (i.e., SystemBoundProvider and XletBoundProvider) of Provider.

The class SystemBoundProvider extends the class Provider and has at least one direct subclass, Tuner. The class XletBoundProvider also extends the class Provider and has at least one direct subclass, SIManagerProvider.

The package org.dvb.spi.si includes the class SIManagerProvider. In one embodiment of the invention, the SIManagerProvider defines the API that is implemented by an Xlet-bound provider to implement the Java TV Service Information API. Because the API is itself abstract and has a single entry point, the API enables one to implement the service provider by only providing a class that implements Java TV's SIManager interface.

The package org.dvb.spi.si.tuner includes the interfaces and methods shown in Table 3.

TABLE 3

| Class/Interface Name | Description |
|---|---|
| TunerListener | Interface used to alert the platform that the list of available services has changed. The new list of services may be obtained from Tuner.getServiceList( ). |
| TunerSession | Interface for a session for presentation of one or more services over a period of time by a Tuner. The first operation on a new session is required to be selection of a service in a service context, and all subsequent operations pertain to the same service context |
| Tuner | Abstract class for a tuner provided by an unbound application. For example, a Tuner can provide the ability to reach services that do not have standardized SI signaling in an IPTV network. |
| TunerLocator | Final class for a locator of a service that has no standardized SI signaling and that is reached by a Tuner. |
| TunerService | Abstract class for a service that is reachable through a Tuner. |

The interface TunerListener includes a method serviceListChanged( ) which is called by the provider implementation to notify the platform that the Tuner's list of available services has changed. The interface TunerSession includes a method destroy( ) that may be called by the system before selection of a new service in some other tuner.

The class Tuner extends SystemBoundProvider and includes the methods shown in Table 4.

TABLE 4

| Method Name | Description |
|---|---|
| registerListener | Abstract method for registering a tuner listener |
| unregisterListener | Abstract method for unregistering a tuner listener |
| getServiceList | Abstract method for getting a list of the tuner services |
| newSession | Abstract method for getting a new tuner session |
| select | Abstract method for selecting a service to be presented in a particular context. There may be several abstract select methods defined. |
| add | Abstract method for adding a service component (for example, subtitles) to the presentation. |
| remove | Abstract method for removing a service component from a presentation. |

TABLE 4-continued

| Method Name | Description |
| --- | --- |
| replace | Abstract method for replacing one service component in a presentation with a different service component. |

The class TunerLocator extends java.lang.Object and implements javax.tv.locator.Locator. Further, the class TunerLocator includes the following methods: hasmultipleTransformations( ), toExternalForm( ), and toString( ). The hasMultipleTransformations( ) method indicates whether the locator has a mapping to multiple transports. The toExternalForm( ) method generates a canonical, string-based representation of the locator. The toString( ) returns the string used to create the locator.

Referring again to FIG. 1, in one or more embodiments of the invention, the presence or absence of a service provider (e.g., SPI provider A (130), SPI provider B (136)) is transparent to Xlets (e.g., Xlet A 9110), Xlet B (112), Xlet C (114)) that may use the services of the service provider. For example, a television set-top box may have one or more Xlets installed that receive one or more services such as a broadcast stream to be displayed to a user. Further, a television set-top box may have two inputs: an Internet connection and a TV antenna. In this example, the stream received through the TV antenna is Channel 2 and is not mediated by a service provider. Whereas, the stream received over the Internet connection is Channel 3 and is mediated by a service provider that can be accessed using a service provider interface (SPI).

If an Xlet makes a call to receive the Channel 2 stream, the call succeeds and a stream received using the antenna is provided to the Xlet. However, if the Xlet makes a call to tune to Channel 3 using the SPI corresponding to the service provider which mediates Channel 3, the success of the call depends on whether the service provider is installed.

If the service provider is not installed, an error is returned to the requesting Xlet. Thereafter, if the service provider is installed, a second call after installation by the Xlet may succeed. In one or more embodiments of the invention, the Xlet is not aware whether the service provider is installed and therefore does not know whether a call for a service will work.

In a system with Xlet bound service providers, each Xlet must install a service provider corresponding to Channel 3 and simply make the call to the service provider interface corresponding to the service provider installed by the Xlet. If the stream or any other requested resource can only be used by one Xlet at a time, the Xlet bound service providers must communicate to ensure that only one Xlet at a time is provisioned the service.

In a system with system bound service providers, the service provider object is shared using inter-Xlet communication and the service provider managing Channel 3 provides centralized management of the service. Therefore, if the stream or any other centrally manage resource is requested, the service provider determines which Xlet receives the service.

Figure 2:
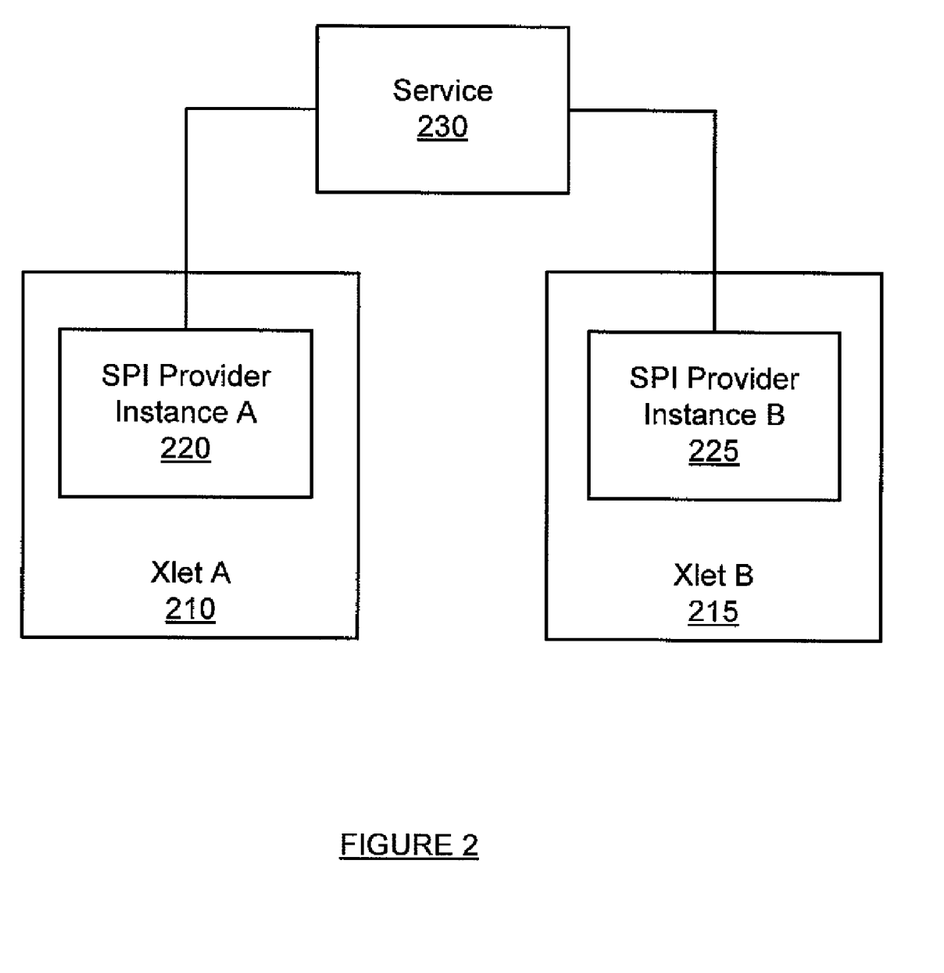
FIG. 2 shows a logic diagram of provision of an Xlet-bound service in accordance with one or more embodiments of the invention.

FIG. 2 shows a system including an Xlet-bound service provider in accordance with one or more embodiments of the invention. As shown in FIG. 2, the system includes two Xlets, Xlet A (210) and Xlet B (215), a service (230), and two instances of a service provider, SPI provider instance A (220) and SPI provider instance B (225) that provides the service (203). The service provider that provides the service (230) is an Xlet-bound service provider. That is, the service provider implements an SPI that extends an Xlet-bound service provider superclass as defined in a service provision framework (e.g., the service provision framework (120) of FIG. 1). Thus, the instances of the service provider, SPI provider instance A (220) and SPI provider instance B (225) provide the SPI and are Xlet-bound, i.e., a single instance may provide services only to a single Xlet, the Xlet to which the instance is bound.

In one or more embodiments of the invention, SPI provider instance A (220) is instantiated by Xlet A (210) and thus may be accessed only by Xlet A (210). Therefore, SPI provider instance A (220) is unavailable to Xlet B (215) or to any other Xlets (not shown) in the system. Accordingly, SPI provider instance B (225) is instantiated by Xlet B (215) to allow Xlet B(215) to use the service (230). Similarly, SPI provider instance B (225) is unavailable to any other Xlets (not shown) in the system. In addition, the instances of the service provider, SPI provider instance A (220) and SPI provider instance B (225), are registered in a service provider registry of the service provision framework. In one or more embodiments of the invention, the lifetime of SPI provider instance A (220) is bound to the lifetime of Xlet A (210) (i.e., SPI provider instance A (220) is terminated when and only when Xlet A (210) is terminated). Similarly, the lifetime of SPI provider instance B (225) is bound to the lifetime of Xlet B (215).

In one or more embodiments of the invention, Xlet A (210) and SPI provider instance A (220) are loaded by the same class loader or class loader hierarchy. Further, Xlet B (215) and SPI provider instance B (225) are loaded by the same class loader or class loader hierarchy. Further, in one or more embodiments of the invention, Xlet A (210) and SPI provider instance A (220) are loaded into the same isolate, and Xlet B (215) and SPI provider instance B (225) are also loaded into another isolate. An isolate is a protected domain in a system that protects one or more execution threads from being adversely affected by other threads in the system. An isolate may run in its own process and have its own address space. Further, an isolate may be transparent to an Xlet operating within it. In addition, isolates can communicate and exchange resource handles (e.g., open files) with other isolates only through an inter-process messaging facility.

Figure 3:
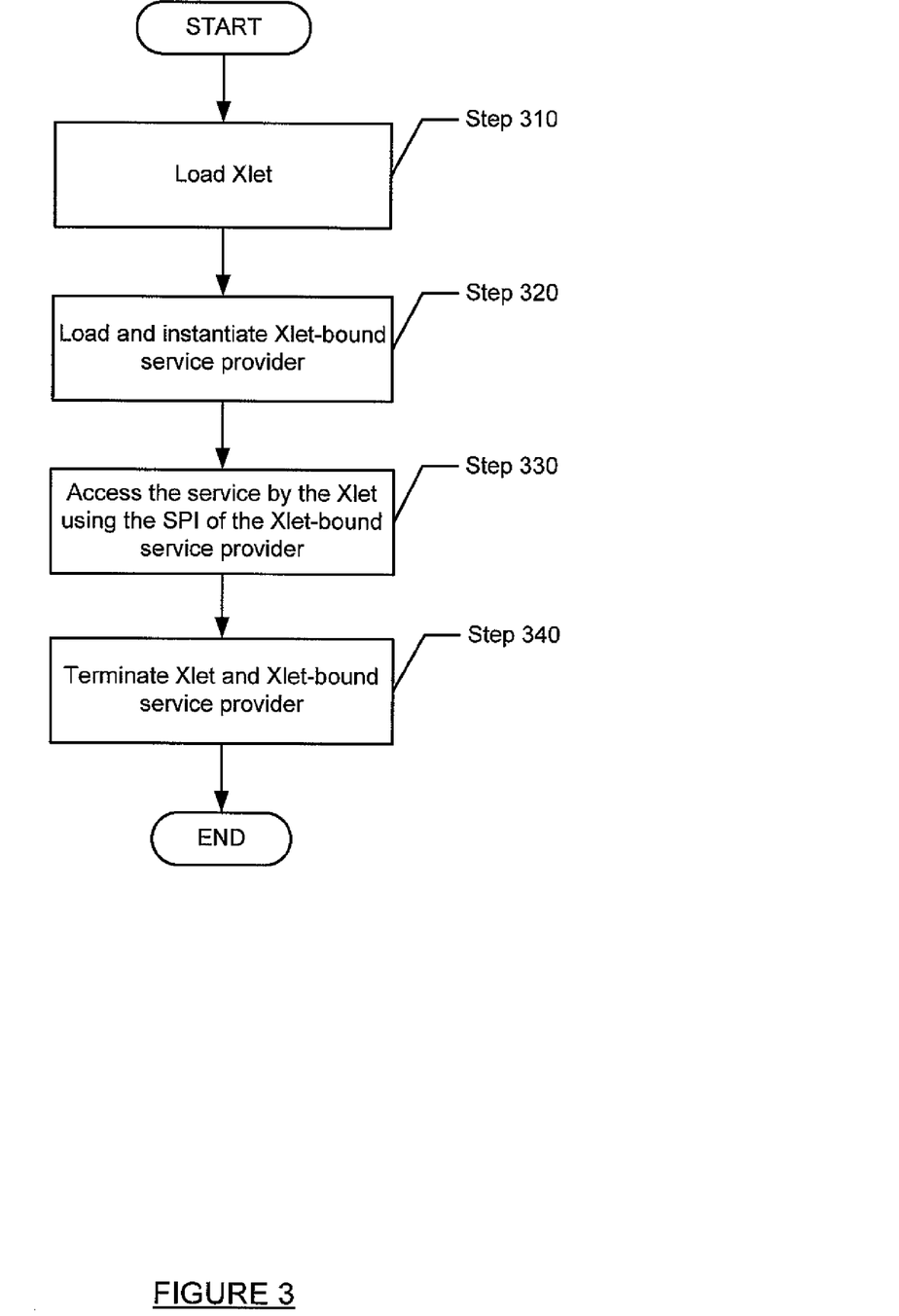
FIGS. 3 and 5 show flowcharts of methods for providing a service in accordance with one or more embodiments of the invention.

FIG. 3 shows a flowchart for using an Xlet-bound service provider in accordance with one or more embodiments of the invention. In one or more embodiments of the invention, one or more of the steps shown in FIG. 3 may be omitted, repeated, performed in parallel, and/or performed in a different order. Accordingly, the specific arrangement of steps shown in FIG. 3 should not be construed as limiting the scope of the invention.

Initially, an Xlet is loaded by a class loader by converting the named class into bits responsible for implementing the class (i.e., creating an object that implements the class) (Step 310). In one or more embodiments of the invention, the loaded Xlet then loads and instantiates an Xlet-bound service provider (Step 320). In order to instantiate the service provider, the Xlet first imports or references the service provider. Thereafter, using the "new" operator, the Xlet instantiates an object of a class of the service provider. Instantiating the object of a class may also be referred to as installing or registering the class. In one or more embodiments of the invention, the service provider and the Xlet are loaded into the same isolate. Further, in one or more embodiments of the invention, the service provider and the Xlet are loaded by the same class loader.

Once the service provider is instantiated, the Xlet uses the SPI of the Xlet-bound service provider to access the service associated with the service provider (Step 330). In one or more embodiments of the invention, the Xlet-bound service provider cannot be uninstalled while the Xlet is running. In one or more embodiments of the invention, the service is not received when the Xlet is in a pause state. The Xlet may resume the service once the Xlet returns to an active state. In one or more embodiments of the invention, the Xlet-bound service provider is continuously available to the Xlet until the Xlet is terminated (Step 340). Further, the service provider is terminated when the Xlet is terminated.

Figure 4:
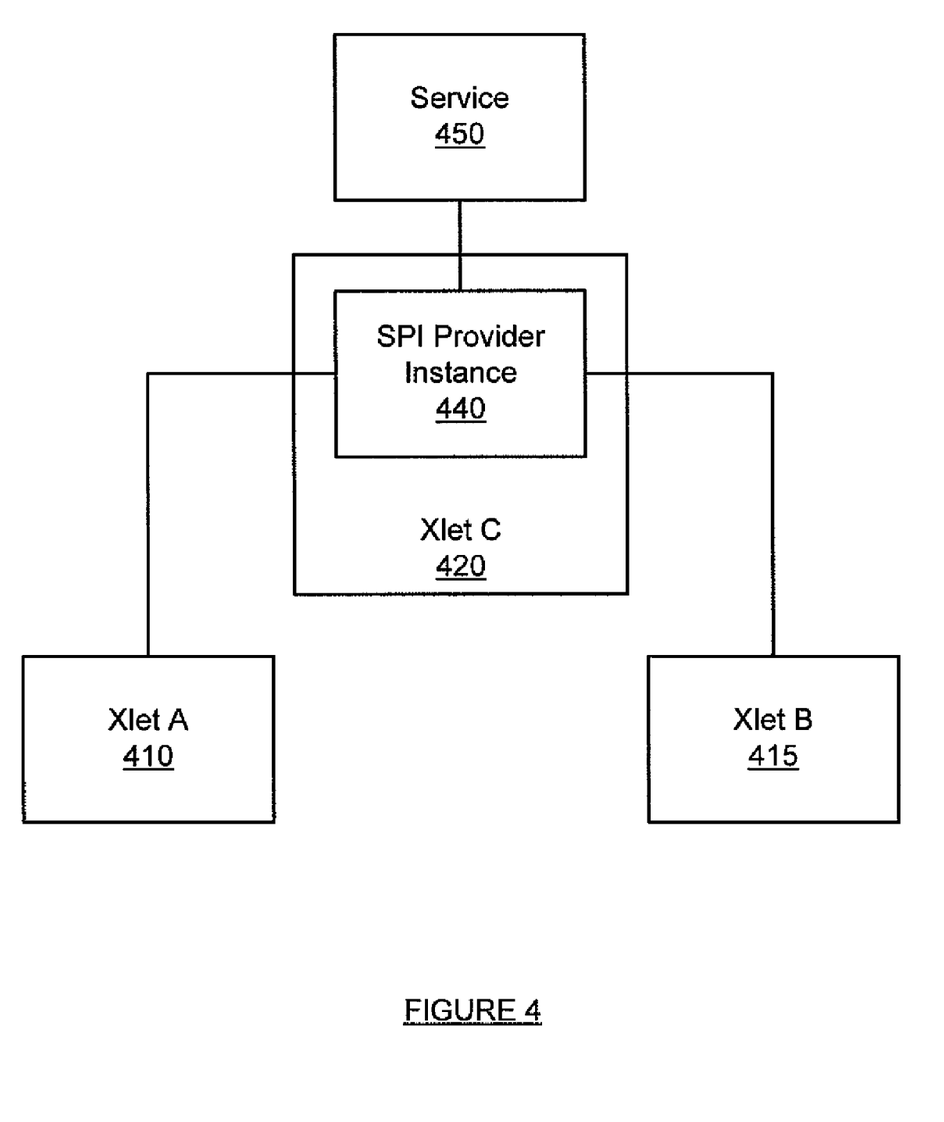
FIG. 4 shows a logic diagram of provision of a system bound service in accordance with one or more embodiments of the invention.

FIG. 4 shows a system including a system bound service provider in accordance with one or more embodiments of the invention. As shown in FIG. 4, the system includes three Xlets, Xlet A (410), Xlet B (415), and Xlet C (420), a service (450), and an instance of a service provider, SPI provider instance (440) that provides the service (450). The service provider that provides the service (450) is a system-bound service provider. That is, the service provider implements an SPI that extends a system bound service provider superclass as defined in a service provision framework (e.g., the service provision framework (120) of FIG. 1). Thus, the instance of the service provider, SPI provider instance (440), provides the SPI and is system bound, i.e., a single instance of the service provider may provide services to multiple Xlets in the system.

As shown in FIG. 4, although the SPI provider instance (440) is loaded and registered by Xlet C (420), the SPI provider instance (440) may be used by Xlet A (410) and Xlet B (415) to access the service (450). Communication between the SPI provider instance (440) and each of Xlet A (410) and Xlet B (415) may be accomplished using some form of inter-process communication (e.g., an indirect mechanism such as a data connection (e.g., a pipe), or a higher-level mechanism like Inter-Xlet Communication (IXC)). Xlet C (420), although causing the SPI provider instance (440) to be loaded, may or may not use the service (450). Further, in one or more embodiments of the invention, the SPI provider instance (440) is loaded into a separate isolate from Xlet A (410) and Xlet B (415).

In one or more embodiments of the invention, the SPI provider instance (440) may be created, terminated, and/or reset independently of Xlet A (410) and Xlet B (415) and may be terminated and/or reset independently of Xlet C (420) (i.e., without adversely affecting the operation of Xlet A (410), Xlet B (415), or Xlet C (420)). In one or more embodiments of the invention, the SPI provider instance (420) may be configured to terminate upon termination of all the Xlets within the system, or may be configured to terminate upon termination or resetting of the entire system.

In one or more embodiments of the invention, the SPI provider instance (440) may provide customized services for Xlet A (410) and Xlet B (415). For example, if the SPI provider instance (440) is an instance of a service provider providing broadcast streams over a network, the SPI provider instance (440) may provide one channel(s) to Xlet A (410) and another channel(s) to Xlet B (415).

Figure 5:
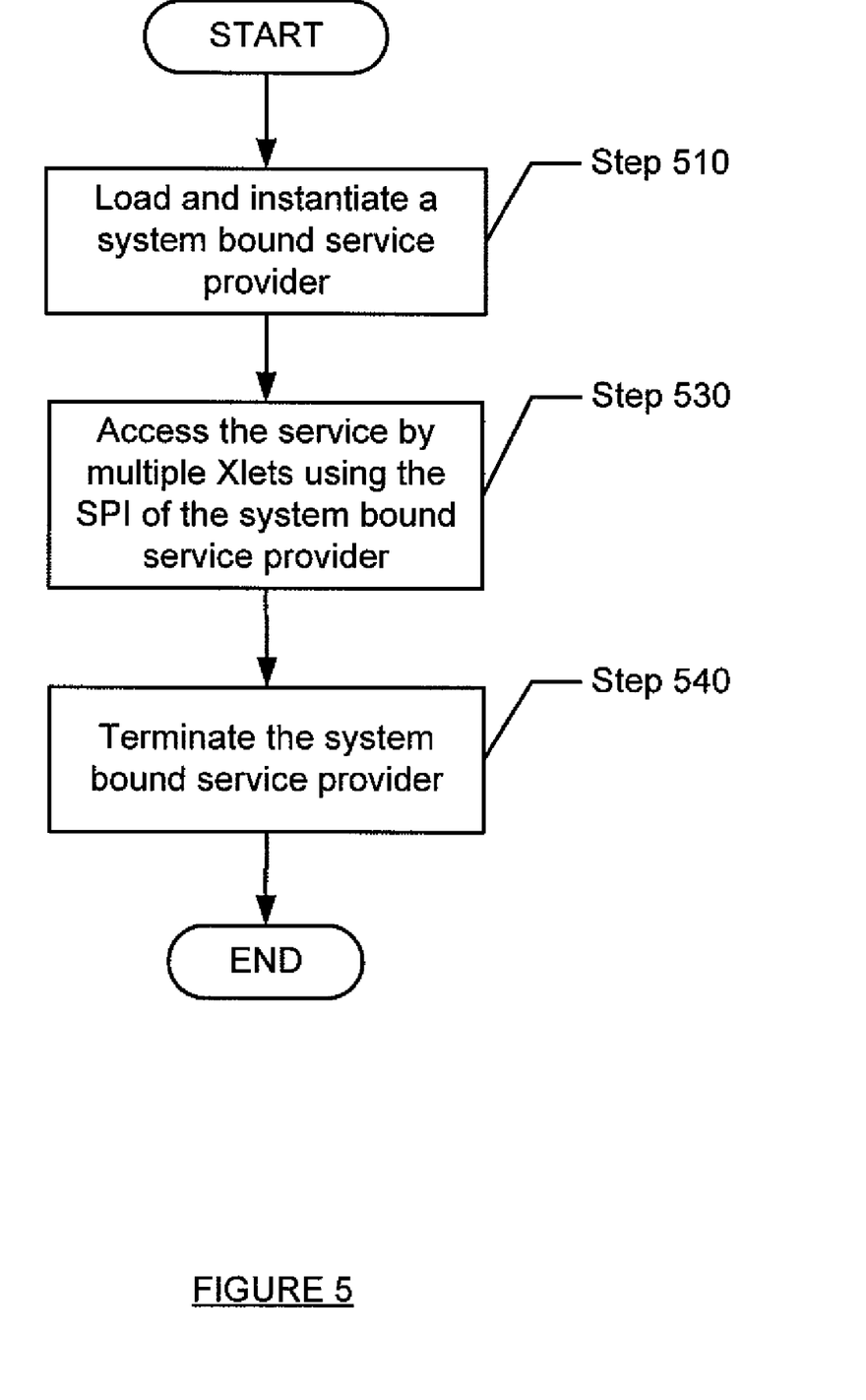

FIG. 5 shows a flowchart for using a system bound service provider in accordance with one or more embodiments of the invention. In one or more embodiments of the invention, one or more of the steps shown in FIG. 5 may be omitted, repeated, performed in parallel, and/or performed in a different order. Accordingly, the specific arrangement of steps shown in FIG. 5 should not be construed as limiting the scope of the invention.

Initially, a system bound service provider is loaded by a class loader and instantiated (Step 510). In one or more embodiments of the invention, the system bound service provider may be loaded and instantiated by one Xlet and may be used by other Xlets. Further, in one or more embodiments of the invention, the system bound service provider may be loaded into an isolate different from the isolate(s) in which any Xlets that use the system bound service provider are loaded. In one or more embodiments of the invention, the service provider may be loaded before or after any Xlets that use the system bound service provider. In addition, the system bound service provider may be instantiated by an Xlet that uses the service provided by the system bound service provider or by an Xlet that does not use the service.

Once the system bound service provider is loaded and instantiated, any Xlet in the system may use the normal platform APIs to accessing the service. The platform will call the SPI of the system bound service provider in the platform implementation of the service (Step 530). In one or more embodiments of the invention any of the Xlets using the service bound service provider and/or the system bound service provider itself may be independently reset, terminated or restarted without affecting the other Xlets, or service providers in the system. Accordingly, in one or more embodiments of the invention, the system bound service provider may be terminated but the Xlets that use the system bound service provider may continue to operate (Step 540).

Figure 6:
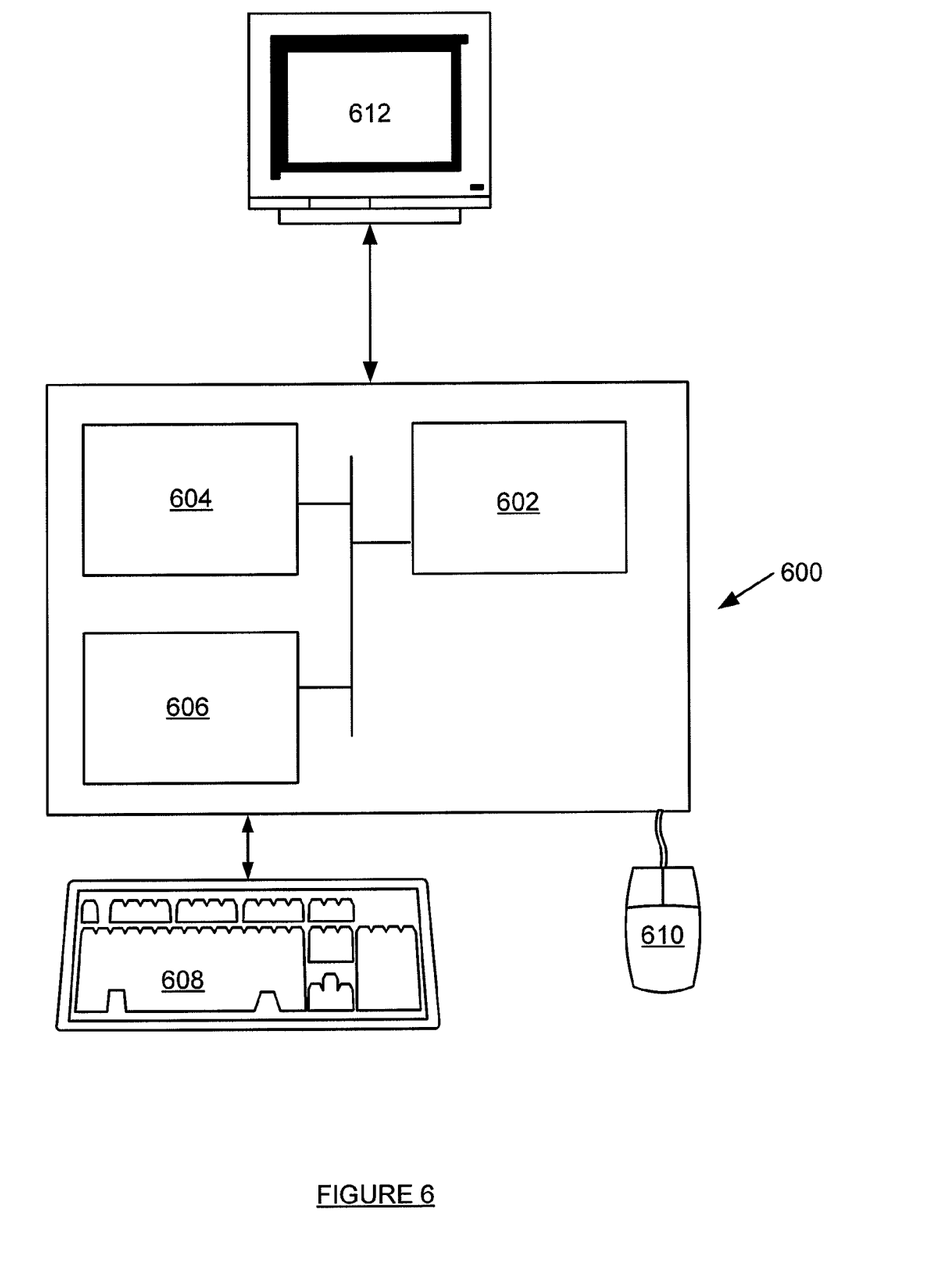
FIG. 6 shows a computer system in accordance with one or more embodiments of the invention.

Embodiments of the invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., the Xlets, the service providers, etc.) may be located on a different node within the distributed system. In one embodiment of the invention, the node may be a computer system. Alternatively, the node may be a processor with associated physical memory. The node may also be a processor with shared memory and/or resources. Further, software instructions to perform embodiments of the invention may be stored on a computer readable medium such as a compact disc (CD), a diskette, a tape, a file, or any other computer readable storage device.

One or more embodiments of the invention provide a service provider for provisioning services to Xlets. One or more embodiments of the invention provide an Xlet bound service provider which provides service only to a single Xlet allowing for greater coherence of a system and customization for a particular service provided to the Xlet.

One or more embodiments of the invention provide a system bound service provider which provides service to all the Xlets in a system. One or more embodiments of the invention provide a service provider in an isolate unaffected by any of the Xlets, the service provider provisions a service to. One or more embodiments of the invention provide centralized management of a service provisioned to Xlets using system bound service providers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing a service on a device comprising:
   instantiating, by a first Xlet, a first service provider instance that provides the service, wherein the first service provider instance implements a first service provider interface (SPI) corresponding to the service, wherein the first SPI is defined by a service provision framework for providing services to Xlets;
   accessing the service by the first Xlet using the first SPI;
   instantiating, by a second Xlet, a second service provider instance that provides the service, wherein the second service provider instance implements a second SPI corresponding to the service, wherein the second SPI is defined by the service provision framework for providing services to Xlets; and
   accessing the service by the second Xlet using the second SPI; and
   denying, to the second Xlet, access to the service by the first service provider instance implementing the first API.

2. The method of claim 1, wherein the first service provider instance is configured to provide the service only to the first Xlet.

3. The method of claim 1, wherein the first service provider instance is terminated when the first Xlet is terminated.

4. The method of claim 1, wherein the first Xlet and the first service provider instance are loaded into a same isolate.

5. The method of claim 1, wherein the first Xlet and the first service provider instance are loaded by a same class loader.

6. The method of claim 1, further comprising:
   using the service by a third Xlet, wherein the third Xlet uses an application programming interface (API) on the device to access the service, and firmware on the device uses the first service provider instance in the first Xlet.

7. The method of claim 6, wherein instantiating the that service provider instance is performed before the third Xlet is loaded.

8. The method of claim 6, wherein the first Xlet comprises the first service provider instance, wherein the first Xlet is loaded into a first isolate and the third Xlet is loaded into at least one other isolate.

9. The method of claim 6, wherein the first Xlet and the third Xlet can each be independently restarted.

10. A system for providing services to Xlets comprising:
    a processor;
    a service provision framework, executing on the processor, comprising:
       a first service provider interface (SPI) for an Xlet-bound service provider, and
       a second SPI for a system bound service provider;
    a first Xlet configured to
       instantiate a first service provider instance implementing the first SPI;
       access a first service using the first SPI, and
       access a second service using the second SPI;
    a second Xlet configured to
       access the second service using the second SPI;
    the first service provider instance implementing the first SPI configured to
       provide, to the first Xlet, access to the first service, and
       deny, to the second Xlet, access to the first service; and
    a second service provider instance implementing the second SPI configured to:
       provide, to the first Xlet, access to the second service, and
       provide, to the second Xlet, access to the second service.

11. The system of claim 10,
    wherein the first service provider instance is terminated when the first Xlet is terminated.

12. The system of claim 11, further comprising:
    a first isolate, wherein the first Xlet and the first service provider instance are loaded into the first isolate.

13. The system of claim 10, further comprising:
    a third Xlet, wherein the second service provider instance is instantiated by the third Xlet.

14. The system of claim 10, further comprising:
    a first isolate; and
    a second isolate,
    wherein the second service provider instance is loaded into the first isolate, and
    wherein the first Xlet and the second Xlet are loaded into the second isolate.

15. The system of claim 10, wherein the first Xlet and the second Xlet communicate with the second service provider instance using interprocess communication.

16. A non-transitory computer readable medium comprising executable instructions to provide a service by:
    instantiating, by a first Xlet, a first service provider instance that provides the service, wherein the first service provider instance implements a first service provider interface (SPI) corresponding to the service, wherein the first SPI is defined by a service provision framework for providing services to Xlets;
    accessing the service by the first Xlet using the first SPI;
    instantiating, by a second Xlet, a second service provider instance that provides the service, wherein the second service provider instance implements a second SPI corresponding to the, wherein the second SPI is defined by the service provision framework for providing services to Xlets;
    accessing the service by the second Xlet using the second SPI; and
    denying, to the second Xlet, access to the service by the first service provider instance implementing the first API.

17. The non-transitory computer readable medium of claim 16, wherein
    the first service provider instance provides the service only to the first Xlet, and
    the first service provider instance is terminated when the first Xlet is terminated.

18. The non-transitory computer readable medium of claim 17, wherein the first Xlet and the first service provider instance are loaded into a same isolate.

19. The non-transitory computer readable medium of claim 16, wherein the first service provider instance is a system bound service provider, and wherein the first service provider instance provides the service to the first Xlet and the second Xlet.

20. The non-transitory computer readable medium of claim 19, wherein the first service provider instance is loaded into a first isolate and the first Xlet and the second Xlet are loaded into at least one other isolate.

* * * * *